United States Patent
Yamamoto (10) Patent No.: US 7,349,666 B2
(45) Date of Patent: Mar. 25, 2008

(54) RADIO COMMUNICATION METHOD AND RADIO COMMUNICATION TERMINAL

(75) Inventor: Katsuya Yamamoto, Chiba (JP)

(73) Assignee: Sony Ericsson Mobile Communications Japan, Inc., Tokyo (JP)

(*) Notice: Subject to any disclaimer, the term of this patent is extended or adjusted under 35 U.S.C. 154(b) by 0 days.

(21) Appl. No.: 10/506,751

(22) PCT Filed: Dec. 26, 2003

(86) PCT No.: PCT/JP03/17062
§ 371 (c)(1), (2), (4) Date: Sep. 3, 2004

(87) PCT Pub. No.: WO2004/066522
PCT Pub. Date: Aug. 5, 2004

(65) Prior Publication Data
US 2005/0130706 A1    Jun. 16, 2005

(30) Foreign Application Priority Data
Jan. 17, 2003  (JP) ............... 2003-010099

(51) Int. Cl.
*H02B 7/00* (2006.01)

(52) U.S. Cl. ............... 455/41.2; 455/41.1; 455/41.3; 455/552.1; 455/553.1; 235/451; 709/228

(58) Field of Classification Search ........... 455/558, 455/41.1, 552.1, 553.1, 41.2, 41.3; 235/451; 709/228
See application file for complete search history.

(56) References Cited

U.S. PATENT DOCUMENTS

| | | | |
|---|---|---|---|
| 6,275,480 B1* | 8/2001 | Schreier | 370/321 |
| 6,282,407 B1* | 8/2001 | Vega et al. | 455/41.1 |
| 6,330,442 B1* | 12/2001 | Seppanen | 455/426.1 |
| 6,400,755 B1* | 6/2002 | Harris et al. | 375/146 |
| 6,618,362 B1* | 9/2003 | Terranova | 370/328 |
| 6,711,207 B1* | 3/2004 | Amrany et al. | 375/222 |
| 6,776,339 B2* | 8/2004 | Piikivi | 235/451 |
| 2002/0118639 A1* | 8/2002 | Chintada et al. | 370/230 |
| 2002/0177407 A1* | 11/2002 | Mitsumoto | 455/41 |
| 2003/0214961 A1* | 11/2003 | Nevo et al. | 370/401 |
| 2004/0176032 A1* | 9/2004 | Kotola et al. | 455/41.2 |

FOREIGN PATENT DOCUMENTS

GB    2 358 991 A    8/2001

(Continued)

OTHER PUBLICATIONS

Search Report from European Patent Office, dated Aug. 14, 2007 (3 pages).

Primary Examiner—William Trost
Assistant Examiner—Ariel Balaoing
(74) Attorney, Agent, or Firm—Sonnenschein Nath & Rosenthal LLP (57) ABSTRACT

A first radio communication processor 110 for making a first bidirectional radio communication with a predetermined station, a second radio communication processor 120 for making a second bidirectional radio communication with an adjacent reader/writer in non-contact manner, and a controller 117 for temporarily stopping output of transmission data in the first radio communication processor when the start of the second radio communication with the reader/writer is detected, are provided.

2 Claims, 6 Drawing Sheets

FOREIGN PATENT DOCUMENTS

| | | |
|---|---|---|
| JP | HEI 10-191454 | 7/1998 |
| JP | 10-285086 | 10/1998 |
| JP | 2000 076399 | 3/2000 |
| JP | 2001144767 | 5/2001 |
| JP | 2001 245339 | 9/2001 |
| JP | 2002-95051 | 3/2002 |
| JP | 2002095051 | 3/2002 |
| JP | 2002095051 A * | 3/2002 |
| JP | 2002-344376 | 11/2002 |
| JP | 2004-48251 | 2/2004 |
| WO | WO 02/056247 A1 | 7/2002 |

* cited by examiner

RADIO COMMUNICATION METHOD AND RADIO COMMUNICATION TERMINAL

BACKGROUND OF THE INVENTION

The present invention relates to a radio communication method and a radio communication unit suitably applied to a mobile phone unit, particularly to the art in which a function of making communication for a non-contact IC card is incorporated into the unit.

It has been heretofore practiced to utilize the non-contact IC card for making various data communication in a short distance. For example, the non-contact IC card is used for a railroad ticket and the like. Specifically, a reader/writer of the non-contact IC card is installed at a wicket; the non-contact IC card is brought close to the reader/writer when passing the wicket; and data stored in the non-contact IC card is read to perform authentication processing and the like.

There are two types of non-contact IC card: a type with a built-in battery and another type without a built-in battery; however, in view of easiness to handle, an operational life and so on, recently the type without a built-in battery has widely been used. In the case where the non-contact IC card without a battery is used, an electric power wave is supplied from the reader/writer side; an antenna on the side of IC card receives the electric power wave to store power in a capacitor in the IC card; and the stored power is utilized for driving the IC card. Thus, the IC card must be brought very close to the reader/writer.

In addition to the above-described railroad ticket, the non-contact IC card is now being applied to an electronic money card, a personal identification card such as an employee identification card and the like. In NIKKEI ELECTRONICS, No. 798, pages 55 to 60 (published by Nikkei Business Publications Inc. on Jun. 18, 2001), there is a description about this non-contact IC card. Note that although the non-contact IC card need not necessarily take a card shape, in this specification a non-contact structure for making a short-distance communication of this kind will be referred to as the non-contact IC card or IC card.

Hereupon, if the non-contact IC card is integrated with portable electronic equipment carried by the user or if the IC card can be installed in the portable electronic equipment, then it will be unnecessary to carry the relevant electronic equipment separately from the IC card and it is convenient for the user. A mobile phone unit is one of the portable electronic equipment on which such integration is assumed.

However, since the mobile phone unit is equipment that transmits and receives an electric wave, when it is assumed that the mobile phone unit is integrated with the non-contact IC card, a radio signal exchanged between the IC card and reader/writer will very likely make an undesirable effect on a signal used in radio telephone communication between the mobile phone unit and a base station or the like.

Conventionally, a frequency bandwidth of the radio signal used in the mobile phone system (from several hundred MHz to several GHz, for example) is different from a frequency bandwidth of the radio signal exchanged between the non-contact IC card and reader/writer (several tens of MHz, for example). However, harmonics of the radio signal transmitted between the non-contact IC card and reader/writer will most likely be a jamming wave against the radio signal used in the mobile phone system.

Therefore, when a function of IC card for non-contact communication of this kind is incorporated in the mobile phone unit, such measures as: adding an anti-interference exclusive circuit to the unit in accordance with a radio communication frequency and a controller-operating clock frequency as the IC card as well as a radio communication frequency and a controller-operating clock frequency as the mobile phone; shielding inside the equipment a circuit portion functioning as the mobile phone unit and a circuit portion functioning as the non-contact IC card from being interfered with each other; and the like are required, which poses a problem to make the structure of equipment complicated.

The present invention has been made in view of the above problems and aims to prevent without difficulty the mutual interference when the non-contact IC card function is incorporated into the mobile phone unit.

SUMMARY OF THE INVENTION

A first aspect of the present invention is a radio communication method in which a function of making a first bidirectional radio communication with a predetermined station and a function of making a second bidirectional radio communication with an adjacent reader/writer are performed, wherein when the start of the second radio communication with the reader/writer is detected, output of transmission data in the first radio communication with the predetermined station is temporarily stopped.

According to the above configuration, even if a signal generated by the communication with the reader/writer may jam another signal transmitted to the predetermined station, because output of transmission data to the predetermined station is stopped temporarily, an error, etc. due to the jamming wave can be prevented from being caused in data arriving at the predetermined station; so that when the non-contact IC card function is incorporated into one mobile phone unit, prevention of the interference can be realized efficiently with simplified configuration and processing, without providing an exclusive circuit or a shield mechanism.

A second aspect of the present invention is the radio communication method according to the first aspect of the present invention, in which the above temporary stop is the processing to stop inputting transmission data into a buffer that temporarily stores the transmission data.

According to the above configuration, only output of the transmission data can be stopped temporarily without difficulty.

A third aspect of the present invention is the radio communication method according to the first aspect of the present invention, in which the temporary stop is the processing to stop inputting the transmission data into a buffer that stores the transmission data temporarily, and even if no data is stored in the buffer, transmission of packets by the first communication is continued.

According to the above configuration, the connection of the radio communication with the predetermined station is maintained and the processing when the output of transmission data is resumed can be simplified.

A fourth aspect of the present invention is the radio communication method according to the first aspect of the present invention, in which the temporary stop is the processing to stop inputting the transmission data into a buffer that stores the transmission data temporarily, and even if no data is stored in the buffer, transmission of packets by the first communication is continued, where the packets transmitted when no data is stored are transmitted at the lowest transmission rate.

According to the above configuration, the efficiency of using a radio transmission line during the temporary stop of outputting data can be improved.

A fifth aspect of the present invention is the radio communication method according to the first aspect of the present invention, in which when completion of the second radio communication is detected, the processing of temporarily stopping transmission data is released.

According to the above configuration, communication of data transmission with the predetermined station can be resumed immediately.

A sixth aspect of the present invention is the radio communication method according to the first aspect of the present invention, in which the second radio communication operates under power obtained by an electric power wave supplied from the reader/writer.

According to the above configuration, the detection, for example, of the electric power wave from the reader/writer can be judged to be the start of radio communication with the reader/writer, so that the start of radio communication can easily be judged.

A seventh aspect of the present invention is a radio communication unit including: a first radio communication processor for performing a first bidirectional radio communication with a predetermined station, a second radio communication processor for performing a second bidirectional radio communication with an adjacent reader/writer, and a controller for temporarily stopping output of transmission data in the first radio communication processor, when the start of the second radio communication with the reader/writer is detected.

According to the above configuration, even if a signal generated by the communication with the reader/writer may jam another signal transmitted to the predetermined station, because output of transmission data to the predetermined station is temporarily stopped, an error, etc. due to the jamming wave can be prevented from being caused in data arriving at the predetermined station; so that when the non-contact IC card function is incorporated into one mobile phone unit, prevention of the interference can be realized efficiently with simplified configuration and processing, without providing an exclusive circuit or a shield mechanism.

An eighth aspect of the present invention is the radio communication unit according to the seventh aspect of the present invention, in which the temporary stop under the control of the controller is the processing to stop inputting of transmission data into a buffer that is provided with the first radio communication processor and stores transmission data temporarily.

According to the above configuration, only output of the transmission data can be stopped temporarily without difficulty.

A ninth aspect of the present invention is the radio communication unit according to the seventh aspect of the present invention, in which the temporary stop under the control of the controller is the processing to stop inputting transmission data into a buffer that is provided with the first radio communication processor and stores the transmission data temporarily, and even if no data is stored in the buffer, transmission of packets by the first communication is continued.

According to the above configuration, the connection of the radio communication with the predetermined station is maintained and the processing when the output of transmission data is resumed can be simplified.

A tenth aspect of the present invention is the radio communication unit according to the seventh aspect of the present invention, in which the temporary stop under the control of the controller is the processing to stop inputting transmission data into a buffer that is provided with the first radio communication processor and stores the transmission data temporarily, and even if no data is stored in the buffer, the control to continue transmission of packets by the first communication is performed, where the packets transmitted when no data is stored are transmitted at the lowest transmission rate.

According to the above configuration, the efficiency of using a radio transmission line during the temporary stop of outputting data can be improved.

An eleventh aspect of the present invention is the radio communication unit according to the seventh aspect of the present invention, in which when the completion of radio communication in the second radio communication processor is detected, the controller releases the processing of temporarily stopping transmission data in the first radio communication processor.

According to the above configuration, communication of data transmission with the predetermined station can be resumed immediately.

A twelfth aspect of the present invention is the radio communication unit according to the seventh aspect of the present invention, in which the second radio communication processor operates under power obtained by receiving an electric power wave supplied from the reader/writer.

According to the above configuration, the detection, for example, of the electric power wave from the reader/writer can be judged to be the start of radio communication with the reader/writer, so that the start of radio communication can easily be judged.

DETAILED DESCRIPTION OF THE PRESENTLY PREFERRED EMBODIMENTS

Hereinafter, an embodiment of the present invention will be described with reference to the accompanying drawings.

Figure 1:
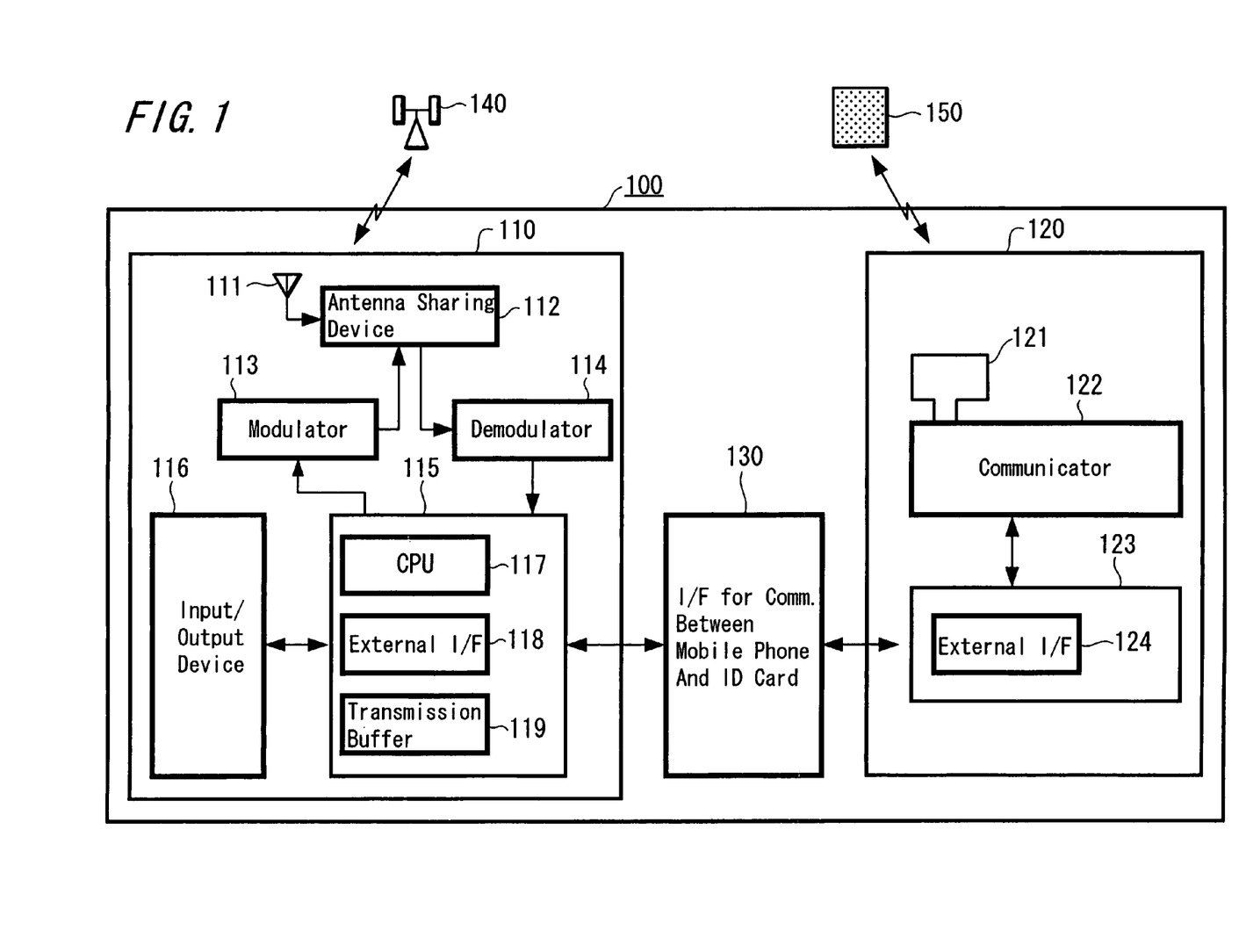
FIG. 1 is a block diagram showing an example of a configuration of a mobile phone unit according to an embodiment of the present invention.

In this embodiment, the non-contact IC card function is incorporated into a mobile phone unit that performs bidirectional radio communication with a predetermined station (base station) prepared for the mobile phone. Specifically, as is shown in FIG. 1, a mobile phone unit 100 of this embodiment includes a mobile phone part 110 and a non-contact IC card function part 120. The mobile phone part 110 is connected to the non-contact IC card function part 120 through an interface 130 for communication between the mobile phone and IC card, by which data transfer can be performed mutually. Although the non-contact IC card function part 120 may be integrally provided with the mobile phone unit 100, the similar structure can be made by, for example, providing a card slot in the unit 100 and installing an IC card functioning as the non-contact IC card function part 120 in the card slot.

The mobile phone part 110 performs bidirectional radio communication with the base station 140 for mobile phones and the like. Specifically, the part 110 includes an antenna 111 for making the radio communication with the base station 140; the antenna 111 is connected to a modulator 113 and a demodulator 114 through an antenna-sharing device 112; a signal modulated by the modulator 113 is transmitted by radio from the antenna 111; and a signal received through the antenna 111 is demodulated by the demodulator 114. With respect to the modulation processing in the modulator 113 and the demodulation processing in the demodulator 114, such processing as determined in the radio phone system to which this mobile phone unit is applied is performed. Specifically, the modulation and demodulation are performed based on the processing method determined by the applied radio phone system, such as a CDMA (Code Division Multiple Access) method and a TDMA (Time Division Multiple Access) method. In this embodiment a telephone unit according to a W-CDMA (Wideband-CDMA) system, that is one of radio telephone systems to which CDMA method is applied, is employed.

A transmission signal supplied to the modulator 113 is generated in a controller 115. A received signal demodulated by the demodulator 114 is also supplied to the controller 115. The controller 115 includes a central processing unit (CPU) 117 as a control means for controlling the operation of the mobile phone unit, and controls data transfer between an input/output device 116 connected to the controller 115 and the modulator 113 and demodulator 114.

When the mobile phone unit 100 is a unit for making a voice communication for example, the input/output device 116 has a microphone and speaker. When the mobile phone unit 100 is a unit to handle various data, a circuit for performing input and output of data is included. When the input/output device 116 has the microphone and speaker, audio data picked up and output by the microphone is supplied to the controller 115; control data is added to the audio data under the control of CPU 117 to form a packetized transmission signal; and the transmission signal is supplied to the modulator 113. Further, audio data, control data, and the like are extracted in the controller 115 from the packetized received signal demodulated by the demodulator 114; and the audio data is supplied to the speaker included in the input/output device 116 to be output and the control data is supplied to the CPU 117.

Transmission data supplied from the input/output device 116 is temporarily stored in a transmission buffer 119 provided in the controller 115. The controller 115 uses the data stored in the transmission buffer 119 to generate packets for transmission which is supplied to the modulator 113. The controller 115 further includes an external interface 118 for making data transfer with the non-contact IC card function part 120.

Figure 2:
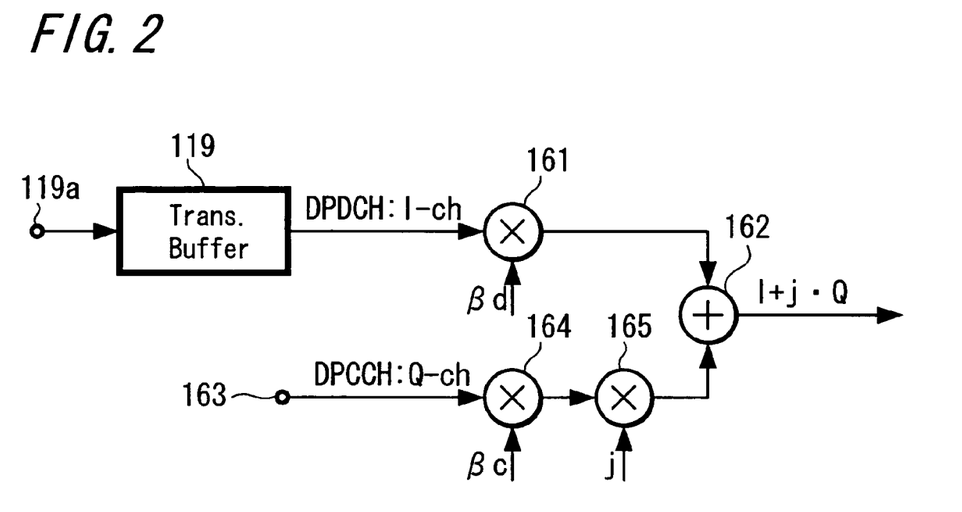
FIG. 2 is a block diagram showing an example of a configuration for processing transmission data according to an embodiment of the present invention.

FIG. 2 shows a configuration for adding the control data to data output from the transmission buffer 119. Data supplied from the preceding circuit (input/output device 116) to an input terminal 119a of the transmission buffer 119 is stored in a memory in the transmission buffer 119. The data stored in transmission buffer 119 is supplied to a quadrature modulator 162 through a multiplier 161 and is superimposed on the control data in the quadrature modulator 162. The control data supplied to an input terminal 163 is supplied to the quadrature modulator 162 through multipliers 164 and 165.

The transmission data output from the transmission buffer 119 is output as a signal of a user-data transmission channel (Dedicated Physical Data Channel: DPDCH) and is multiplied in the multiplier 161 by a gain coefficient βd corresponding to transmission power. An output of the multiplier 161 is supplied to the quadrature modulator 162 as a signal of an I channel.

The control data supplied to the input terminal 163 is a signal of a control-data transmission channel (Dedicated Physical Control Channel: DPCCH) and is multiplied in the multiplier 164 by a gain coefficient βc corresponding to the transmission power to be made into an orthogonal Q channel in the multiplier 165 and then supplied to the quadrature modulator 162.

In the quadrature modulator 162, quadrature modulation is performed on the I-channel signal and Q-channel signal to be a transmission signal (I+j·Q), which is supplied to the modulator 113. In this connection, the gain coefficient βd multiplying in the multiplier 161 is variably set depending on an amount of transmission data (user data) output from the transmission buffer 119, so that transmission rate can variably be set. For example, when there is no user data to transmit, the gain coefficient βd is set to zero and the quadrature modulator 162 may output only a signal of the control-data transmission channel (DPCCH) as the transmission signal. When there exists the user data to be transmitted, the gain coefficient βd is set to a value in response to the transmission power at that time. The state in which the gain of user data is set to zero is one that the transmission power for the mobile phone unit 100 is set to the minimum. When transmission processing is actually performed, a congestion management function (also termed flow control) of performing control to make an amount of data temporarily stored in the transmission buffer 119 fall within a predetermined range is executed under the control of CPU 117 or the like. This flow control will be described later in detail.

Figure 3:
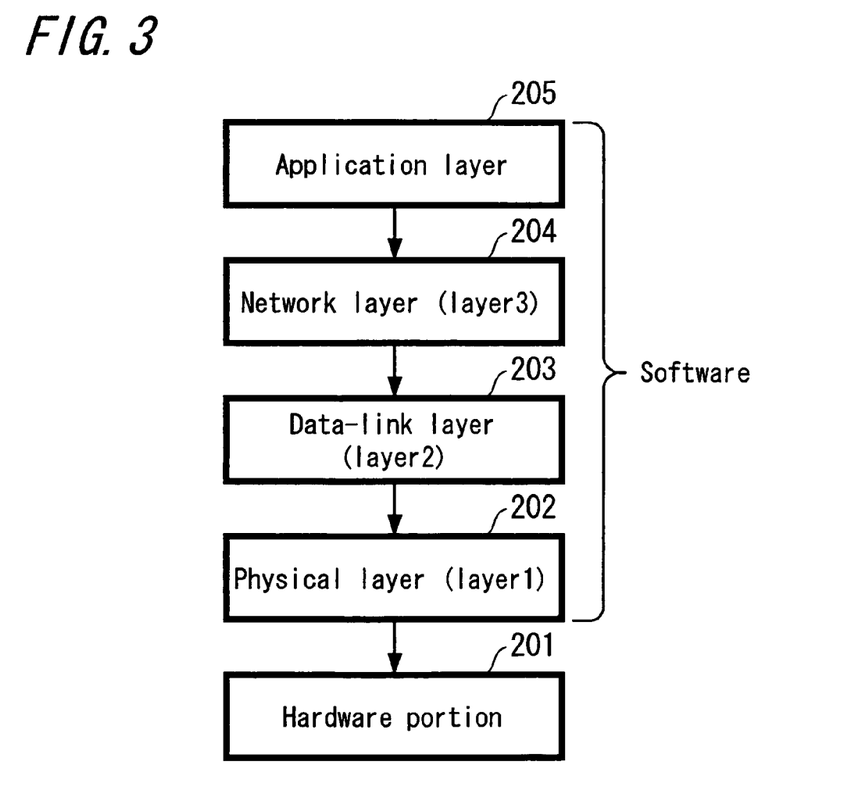
FIG. 3 is a block diagram showing an example of a structure of communication layers according to an embodiment of the present invention.

FIG. 3 shows an example of a software-hierarchy model when communication is made by the mobile phone part 110 of the mobile phone unit 100 in this embodiment. As is shown, a plurality of layers of software are prepared on a hardware portion 201. Specifically, on the hardware portion 201 is prepared a physical layer (layer 1) 202 which performs the read/write processing and the interrupt processing (also termed interrupt-handler processing) to the hardware portion 201 and provides the functions to a data-link layer (layer 2) 203. The data-link layer 203 performs order and priority management, retransmitting management, and congestion management of transmission data packets and provides the functions to a network layer (layer 3) 204. The network layer 204 performs communication-call control, unit-move management and radio resource management and provides the functions to an application layer 205. The application layer 205 realizes a user interface, telephone function or various applications of the mobile phone.

The data-link layer (layer 2) 203 has a transmission data-packet congestion management function to manage the transmission buffer. Specifically, when a certain amount of unsent packets or more is stored in the transmission buffer as a demand for transmission increases for example, the data-link layer 203 issues a wait-before-transmit request (X off) to the upper layer. Further, if transmission processing catches up to make the unsent packets stored in the transmission buffer fall within a certain amount, the data-link layer 203 issues a wait-before-transmit release request (X on) to the upper layer. The above-described flow control is performed by means of such processing of the data-link layer 203.

Next, the non-contact IC card function part 120 of the mobile phone unit 100 shown in FIG. 1 will be described. In the non-contact IC card function part 120, a short range communication loop antenna 121 is connected to a communicator 122. Hereupon, it is designed that when the short range communication loop antenna 121 is brought close to an external card reader/writer 150 at a distance of, for example, about several cm to several tens of cm, the antenna 121 receives an electric power wave supplied from the reader/writer 150 and supplies the received signal of electric power wave to a capacitor (not shown) in the communicator 122 to be charged. The charged signal is employed as a driving power source of the communicator 122. Therefore, when the non-contact IC card function part 120 comes close to the card reader/writer 150, the communication is started automatically.

Then, receiving processing of extracting in the communicator 122 data superimposed on the electric power wave is performed and a transmission signal generated in the communicator 122 can be supplied to the short range communication loop antenna 121 to be transmitted to the reader/writer 150 by radio transmission. This transmission processing is performed also using the power source based on the electric power wave supplied from the reader/writer 150. A controller 123 is connected to the communicator 122 to perform such processing as: discriminating data transmitted by radio from the reader/writer 150, processing of generating data transmitted by radio to the reader/writer 150 and the like.

Although no particular description is given herein on a specific use of the non-contact IC card function part 120, at least identification data for functioning as the non-contact IC card is set in the controller 123 and the identification data is transmitted directly or with encryption to the reader/writer 150. Moreover, the controller 123 stores necessary data among data sent from the reader/writer 150.

The controller 123 includes an external interface 124 for making data transfer with another external interface 118 in the controller 115 on the side of the mobile phone part 110 through the interface 130 for communication between mobile phone and IC card. With this structure, a mutual data transfer between the non-contact IC card function part 120 and mobile phone part 110 can be performed.

Figure 4:
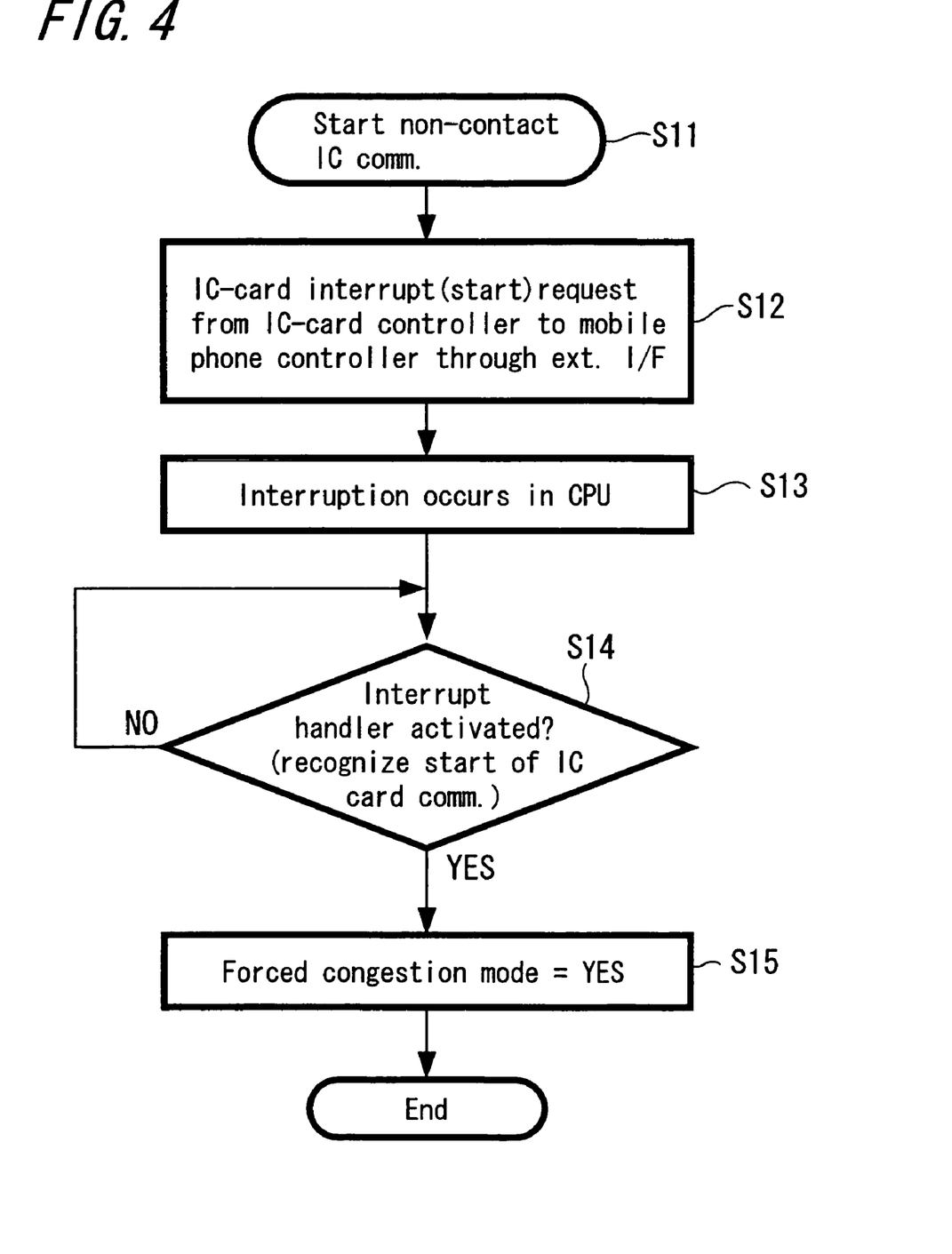
FIG. 4 is a flowchart showing an example of processing of starting IC card communication according to an embodiment of the present invention.

Next, referring to flowcharts of FIG. 4 and after, description will be given to processing when the mobile phone unit 100 in this embodiment comes close to the card reader/writer 150 to perform communication with the card reader/writer 150.

First, the processing to start communication by the non-contact IC card function part 120 of mobile phone unit 100 will be described with reference to the flowchart of FIG. 4. When the communicator 122 in the non-contact IC card function part 120 receives a signal from the reader/writer (step S11), the controller 123 in the non-contact IC card function part 120 transmits an interrupt start request to the controller 115 on the side of the mobile phone part 110 through the external interface 124 (step S12).

When the interrupt start request arrives at the controller 115 on the side of the mobile phone part 110, an interrupt notice arrives at the CPU 117 (step S13). When the interrupt occurs in the CPU 117, an interrupt handler is activated to recognize the cause of the interruption (in this case, the start of IC card communication) (step S14) and then a forced congestion mode started is set as a parameter for controlling the data-link layer (step S15) to end the processing of the non-contact IC card function part at the start of communication. It is noted that the forced congestion mode is a mode that is not set on normal occasions.

Figure 5:
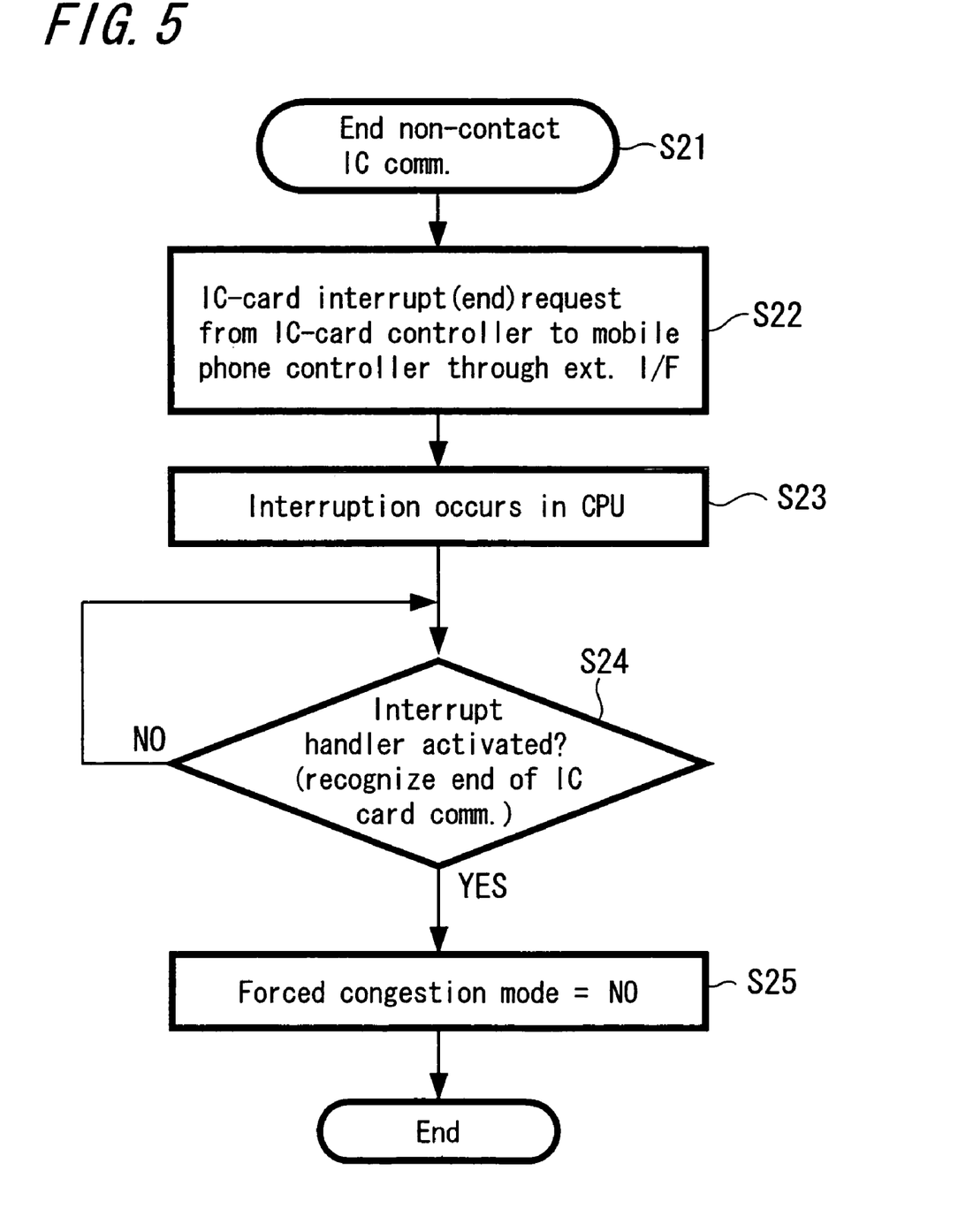
FIG. 5 is a flowchart showing an example of processing of ending IC card communication according to an embodiment of the present invention.

Next, the processing to end communication in the non-contact IC card function part 120 will be described with reference to a flowchart of FIG. 5. When the communication with the reader/writer in the communicator 122 of non-contact IC card function part 120 ends (step S21), the controller 123 in the non-contact IC card function part 120 transmits an interrupt end request to the controller 115 on the side of the mobile phone part 110 through the external interface 124 (step S22).

When the interrupt end request arrives at the controller 115 on the side of the mobile phone part 110, an interrupt notice arrives at the CPU 117 (step S23). When the interrupt occurs in the CPU 117, the interrupt handler is activated to recognize the cause of the interruption (in this case, the end of IC card communication) (step S24) and a forced congestion mode ended is set (step S25) to end the processing of non-contact IC card function part at the end of communication.

Figure 6:
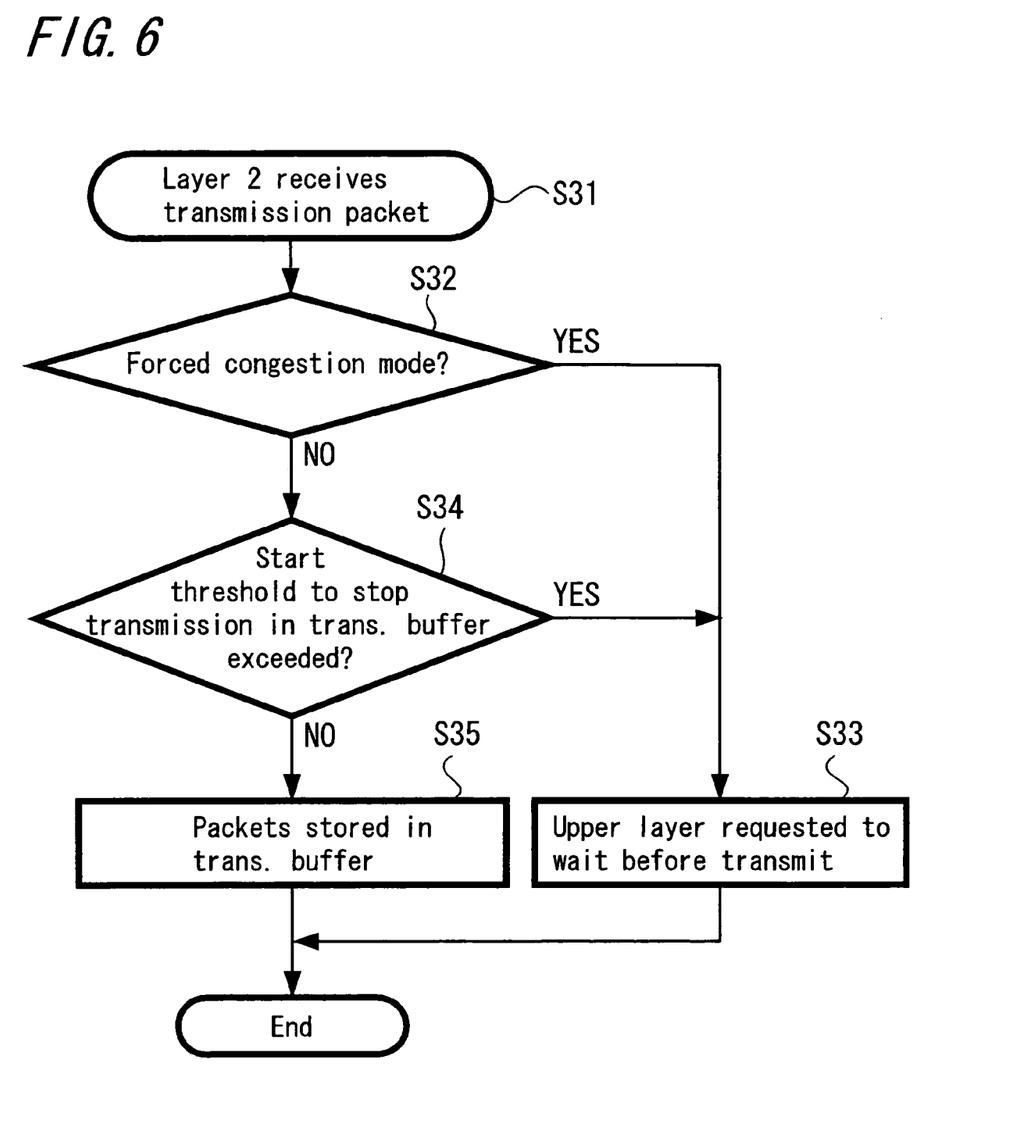
FIG. 6 is a flowchart showing an example of processing of receiving transmission packets in a layer 2 according to an embodiment of the present invention.

Next, the processing in the data-link layer (layer 2) 203 on the side of mobile phone part 110 to receive transmission packets into the transmission buffer 119 will be described with reference to a flowchart of FIG. 6. When it is detected that the data-link layer receives the transmission packets (packetized transmission data: for example, audio packet, data packet, etc.) from the upper layer (step S31), whether or not the forced congestion mode is set in the present mode of operation is judged (step S32). When it is judged that the forced congestion mode is set, the upper layer is requested to wait before transmit (step S33). An example of the case where it is judged that the forced congestion mode is being set in step S32 is the case of step S15 shown in the flowchart of FIG. 4, in which the non-contact IC-card communication is started.

When it is judged that the forced congestion mode is not set in step S32, whether or not an amount of data stored in the transmission buffer exceeds a start threshold to stop transmission is judged (step S34), and if the start threshold to stop transmission is exceeded, the processing moves to step S33 and the upper layer is also requested to wait before transmit. If the start threshold to stop transmission is not exceeded, the received transmission packets are stored in the transmission buffer 119 (step S35).

Figure 7:
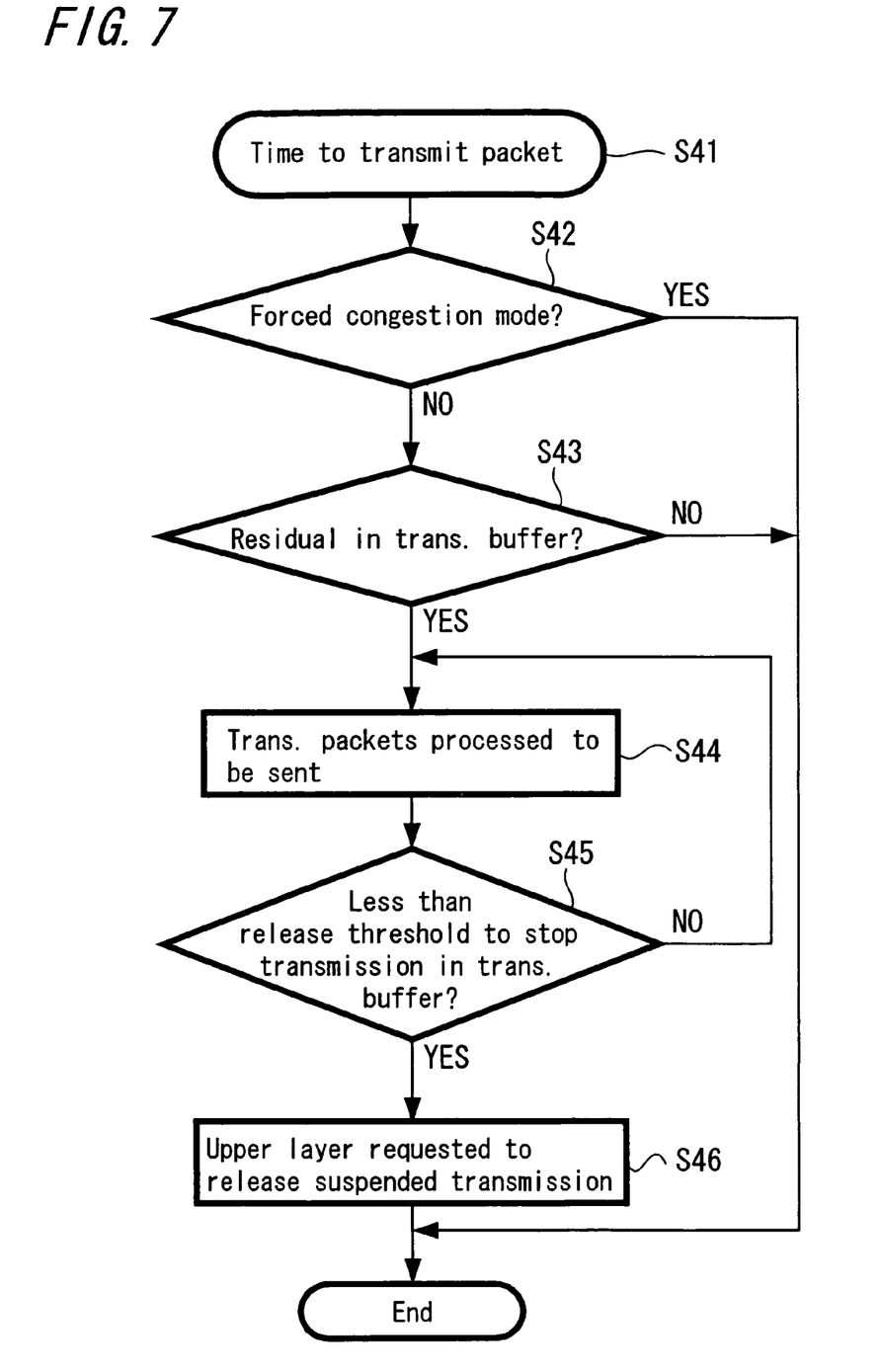
FIG. 7 is a flowchart showing an example of processing of transmitting the transmission packets in the layer 2 according to an embodiment of the present invention.

Next, the processing in the data-link layer to transmit data thus stored in the transmission buffer 119 will be described with reference to a flowchart of FIG. 7. Timing to transmit the packets is conventionally set in regular cycles; and when the time to transmit the packet has come (step S41), whether the present mode of operation is the forced congestion mode or not is judged (step S42). If the forced congestion mode has been set in this step, the transmission processing in the data-link layer is ended and the data-link layer waits for the next time to transmit the packet.

If it is judged that no forced congestion mode is set in step S42, whether or not there is any data remaining in the transmission buffer is judged (step S43). When there is no residual data in the transmission buffer, the transmission processing also comes to an end and the data-link layer waits for the next time to transmit the packet.

When it is judged that there is residual data in the transmission buffer in step S43, data stored in the transmission buffer is output therefrom and the output data is processed to transmit (step S44). Subsequently, whether the amount of stored data is less than a release threshold to stop transmission in the transmission buffer is judged (step S45), and the transmission processing is continued in step S44 until to be less than the release threshold to stop transmission; and if the amount becomes less than the release threshold to stop transmission, the data-link layer 203 notifies the upper layer of the wait-before-transmit release request (step S46) and the transmission processing at this time is ended. Additionally, having described herein the receiving processing (FIG. 6) and transmission processing (FIG. 7) on the transmission packets as asynchronous separate processing, those two sets of processing may be performed as a sequence of processing.

As described above, when the transmission processing in the mobile phone part 110 of mobile phone unit 100 in this embodiment is performed and communication in the non-contact IC card function part 120 incorporated in the unit 100 is started, the forced congestion mode is immediately set to stop input processing of transmission data into the transmission buffer in mobile phone part 110, whereby transmission of user data from the unit 100 to the base station will be stopped. Therefore, communication in the non-contact IC card function part 120 will not interfere with communication in the mobile phone part 110, so that radio-wave interference due to simultaneous operation of both the communicating parts can be reduced greatly.

When the communication in non-contact IC card function part 120 comes to an end, the forced congestion mode is immediately released to resume the input processing of transmission data into the transmission buffer in the mobile phone part 110, whereby the transmission of user data from the unit 100 to the base station will be resumed. Conventionally, communication between the non-contact IC function part 120 and the card reader/writer is completed in considerably short period of time of about one second, and when audio packets for example are transmitted, a mute condition lasts only for a short time during the communication with the reader/writer; and also when data packets are transmitted, only a slight delay is caused. Thus, there occurs no large hindrance to the radio telephone communication.

Moreover, since transmission of only the user data such as audio packets and data packets is stopped during communication in the non-contact IC card function part 120 and transmission of the control data is continued as described with reference to FIG. 2, the connected state of radio telephone line between the base station and unit 100 is maintained, so that such accidents as line cutoff due to a temporary stop of communication can be prevented. Furthermore, in the state in which transmission of user data is stopped, the transmission is performed under the minimum transmission power, so that transmission is performed at the lowest rate to suppress interference with the communication between the non-contact IC card function part 120 and reader/writer to the minimum amount.

Accordingly, in this embodiment, processing to temporarily stop transmission is performed for preventing the interference, using the flow control function of transmission buffer which is originally possessed by a communication processor for mobile phone in the mobile phone unit, so that no new circuit is required for hardware, and also the function of setting the forced congestion mode which is originally possessed by the layer only need to be somewhat modified for software to control communication, which can be realized without difficulty and can contribute to lowering cost of the mobile phone unit and miniaturization thereof.

Moreover, in the above-described embodiment, when communication in the non-contact IC card function part is started, processing to stop transmission is performed, and when the communication in the non-contact IC card function part comes to an end, processing to resume transmission is performed; however, it may be arranged that, by regarding a time required for the communication in non-contact IC card function part as an approximately fixed time (for example a time t of about one second), transmission is stopped after the communication in non-contact IC card function part has started until the time t passes. With that configuration, control processing when the communication in non-contact IC card function part comes to an end can be omitted.

Having described the embodiment in which the non-contact IC card function part is incorporated in the mobile phone unit of W-CDMA system, it is needless to say that the present invention is also applicable to a case where the non-contact IC card function part is incorporated in a mobile phone unit of other systems.

The invention claimed is:

1. A radio communication method in a phone having a first part operatively configured to effect a first bidirectional radio communication with a predetermined station and a second part operatively configured to effect a second bidirectional radio communication with a reader/writer when the phone is positioned adjacent to the reader/writer, the method comprising:

detecting, via the second part of the phone, a signal transmitted by the reader/writer to start the second radio communication with the reader/writer; and in response to detecting the signal transmitted by the reader/writer to start the second radio communication with said reader/writer, temporarily stopping output of transmission data in the first radio communication with said predetermined station such that the second radio communication is immediately inhibited from causing interference in the first radio communication, wherein the step of temporarily stopping output of transmission data comprises stopping, via a controller associated with the second part of the phone, the inputting of transmission data into a buffer that temporarily stores the transmission data, wherein the first part of the phone includes a software-hierarchy communication model having a data-link layer and a another layer, the data-link layer being operatively configured to manage transmission data congestion associated with the other layer when in a first mode and the step of temporarily stopping output of transmission data further comprises temporarily forcing the data-link layer into the first mode irregardless of whether the other layer is in a data congestion state.

2. A radio communication unit comprising:

a first radio communication processor operatively configured to generate a first bidirectional radio communication with a predetermined station;

a second radio communication processor operatively configured to generate a second bidirectional radio communication with an adjacent reader/writer; and a controller operatively configured to detect a signal transmitted by the reader/writer for starting the second radio communication with the reader/writer and to temporarily stop output of transmission data in said first radio communication processor in response to detecting the signal such that the second radio communication is immediately inhibited from causing interference in the first radio communication;

a buffer used by the first radio communication processor to temporarily store the transmission data for output, wherein the controller stops the output of transmission data by temporarily inhibiting the input of the transmission data into the buffer;

a software-hierarchy communication model run by the first radio communication processor, the communication model having a data-link layer and an another layer, the data-link layer being operatively configured to manage transmission data congestion associated with the other layer when in a first mode, wherein the step of temporarily stopping output of transmission data further comprises temporarily forcing the data-link layer into the first mode irregardless of whether the other layer is in a data congestion state.

* * * * *